United States Patent
Barton et al.

(10) Patent No.: US 11,171,844 B2
(45) Date of Patent: Nov. 9, 2021

(54) SCALABLE HIERARCHICAL DATA AUTOMATION IN A NETWORK

(71) Applicant: Cisco Technology, Inc., San Jose, CA (US)

(72) Inventors: Robert E. Barton, Richmond (CA); Jerome Henry, Pittsboro, NC (US); Thomas Szigeti, Vancouver (CA)

(73) Assignee: Cisco Technology, Inc., San Jose, CA (US)

(*) Notice: Subject to any disclaimer, the term of this patent is extended or adjusted under 35 U.S.C. 154(b) by 11 days.

(21) Appl. No.: 16/516,177

(22) Filed: Jul. 18, 2019

(65) Prior Publication Data

US 2020/0389373 A1 Dec. 10, 2020

Related U.S. Application Data

(60) Provisional application No. 62/858,843, filed on Jun. 7, 2019.

(51) Int. Cl.
*H04L 12/24* (2006.01)

(52) U.S. Cl.
CPC ...... *H04L 41/5048* (2013.01); *H04L 41/0893* (2013.01); *H04L 41/12* (2013.01); *H04L 41/5012* (2013.01)

(58) Field of Classification Search
None
See application file for complete search history.

(56) References Cited

U.S. PATENT DOCUMENTS

| 9,485,197 B2 | 11/2016 | Dutta et al. |
| 9,582,221 B2 | 2/2017 | Du et al. |
| 9,929,915 B2 | 3/2018 | Erickson et al. |

(Continued)

FOREIGN PATENT DOCUMENTS

| CN | 104052789 A | 9/2014 |
| EP | 1185029 A2 | 3/2002 |

(Continued)

OTHER PUBLICATIONS

PCT Notification of Transmittal of the International Search Report and the Written Opinion of the International Searching Authority, or the Declaration for Application No. PCT/US2020/036259 dated Sep. 14, 2020.

*Primary Examiner* — Joshua Joo
(74) *Attorney, Agent, or Firm* — Patterson + Sheridan, LLP

(57) ABSTRACT

Techniques for deploying data services in a centrally managed network in a scalable, hierarchical manner are described. An example method generally includes generating a topological description of the centrally managed network, the topological description identifying network entities in the centrally managed network and connections between network entities in the network. A data management hierarchy for the centrally managed network may be generated from the topological description of the centrally managed network, and the data management hierarchy may identify network entities at which data services may be deployed in the centrally managed network. Data services and data rules may be deployed to the identified network entities based on the data management hierarchy, and data may be processed in the centrally managed network through the deployed data services.

18 Claims, 6 Drawing Sheets

(56) References Cited

U.S. PATENT DOCUMENTS

| | | | |
|---|---|---|---|
| 10,078,537 B1 | 9/2018 | Nanda et al. | |
| 2002/0133504 A1* | 9/2002 | Vlahos | G06F 16/256 |
| 2010/0005160 A1* | 1/2010 | Sparks | H04L 41/12 |
| | | | 709/222 |
| 2011/0106942 A1* | 5/2011 | Roskowski | H04L 43/12 |
| | | | 709/224 |
| 2011/0243144 A1* | 10/2011 | Kwon | H04L 49/70 |
| | | | 370/400 |
| 2012/0089726 A1* | 4/2012 | Doddavula | G06F 9/5072 |
| | | | 709/224 |
| 2013/0067049 A1* | 3/2013 | Ghosh | H04L 41/082 |
| | | | 709/221 |
| 2014/0280949 A1 | 9/2014 | Anantharam et al. | |
| 2015/0263913 A1* | 9/2015 | De Temmerman | G06F 17/40 |
| | | | 709/224 |
| 2016/0036636 A1 | 2/2016 | Erickson et al. | |
| 2016/0261508 A1 | 9/2016 | Anantharam et al. | |
| 2017/0019308 A1* | 1/2017 | Rapoport | H04L 41/12 |
| 2017/0085635 A1* | 3/2017 | Nicholls | H04L 41/12 |
| 2017/0126472 A1* | 5/2017 | Margalit | H04L 43/08 |
| 2017/0249763 A1* | 8/2017 | Garvey | G06Q 10/04 |
| 2017/0250873 A1* | 8/2017 | Tee | H04L 43/0823 |
| 2017/0324802 A1* | 11/2017 | Kim | H04L 41/5032 |
| 2018/0302327 A1 | 10/2018 | Anantharam et al. | |
| 2020/0036607 A1* | 1/2020 | Kirner | H04L 41/0893 |
| 2020/0067799 A1* | 2/2020 | Lenglet | H04L 43/024 |

FOREIGN PATENT DOCUMENTS

| | | |
|---|---|---|
| EP | 3175579 A1 | 6/2017 |
| JP | 2017524320 A | 8/2017 |
| WO | 2015191965 A2 | 12/2015 |
| WO | 2016019172 A1 | 2/2016 |

\* cited by examiner

SCALABLE HIERARCHICAL DATA AUTOMATION IN A NETWORK

CROSS-REFERENCE TO RELATED APPLICATIONS

This application claims benefit of U.S. Provisional Patent Application Ser. No. 62/858,843, entitled "Scalable Hierarchical Data Automation in a Network," filed Jun. 6, 2019 and assigned to the assignee hereof, the contents of which are hereby incorporated by reference in its entirety.

TECHNICAL FIELD

Embodiments presented in this disclosure generally relate to data analysis systems for managing networks and managing the performance of these networks. More specifically, embodiments disclosed herein relate to a hierarchical deployment of data services on various network entities in a network to offload processing of network data to individual network entities in the network to facilitate scalable data processing in a network.

BACKGROUND

Networks generally may be configured from a variety of network elements, such as routers, switches, access points, and the like. In some cases, these network elements may be organized in a hierarchical manner, in which a central network entity in a software defined network (SDN) provisions and manages other network entities in the network. In provisioning and managing other network entities in the network, the central network entity may include various analytics tools that ingest and analyze data in real-time to facilitate network management and performance management.

Network entities in an SDN may generate large amounts of data for the central network entity to analyze. Because of the large amounts of data generated within an SDN and the amount of computing power needed to process this data in real-time, a central network entity may be restricted to managing a limited number of endpoint devices (e.g., desktop computers, laptop computers, mobile phones, tablets, servers, etc.) in the SDN. However, this limited number of endpoint devices may be less than the number of endpoint devices deployed in an organization. Further, with the advent of Internet of Things devices, many more devices may become endpoint devices within an SDN. For example, lighting devices, sensors, heating, ventilation, and air conditioning (HVAC) devices, appliances, and other connected devices may be endpoints in an SDN. Each of these devices may generate additional data for analysis by the central network entity, which may further exacerbate scalability issues with managing a network through a central network entity having an ability to manage a limited number of endpoint devices in an SDN.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
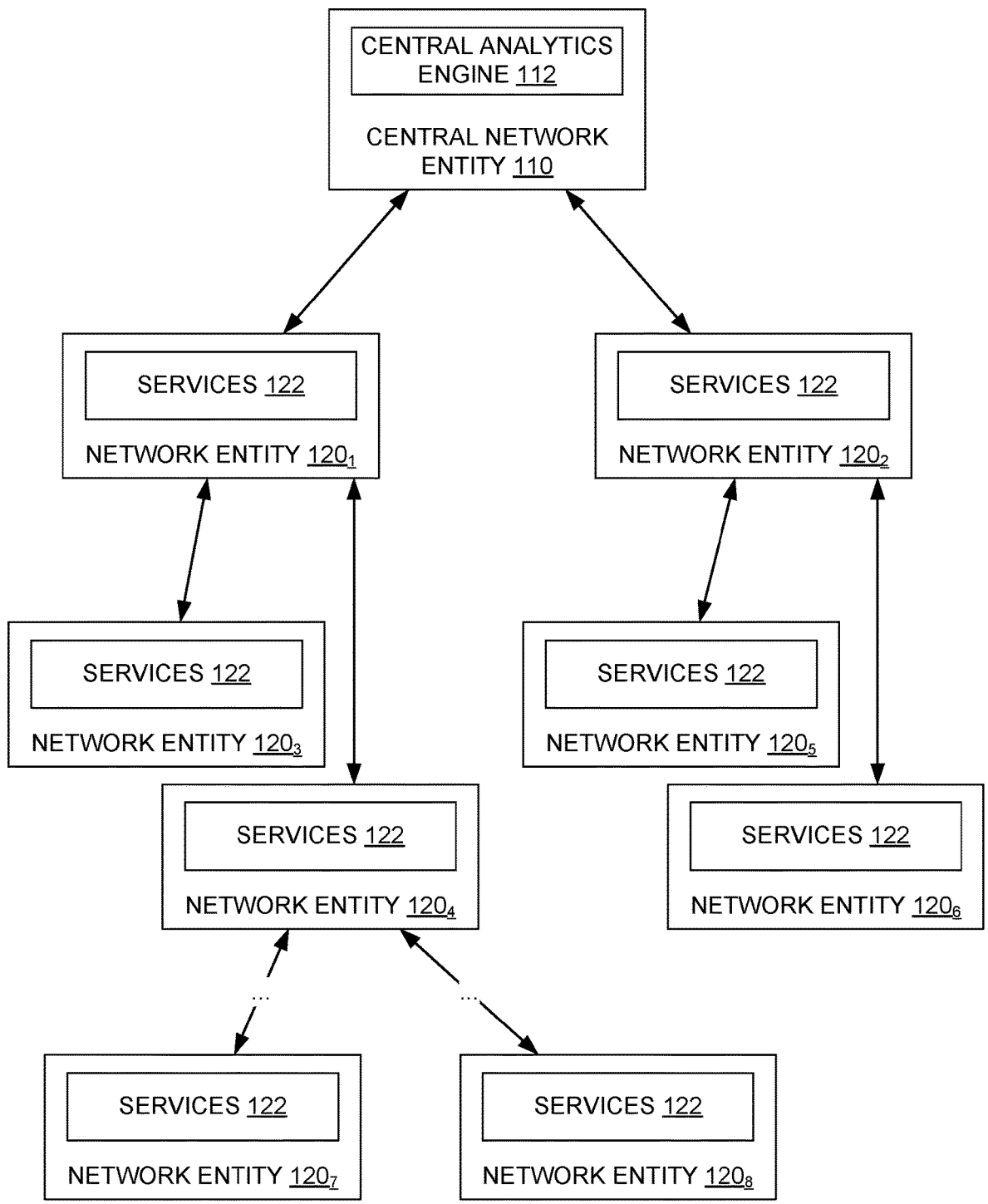
FIG. 1 illustrates a network, according to one embodiment.

Embodiments described herein present a method for deploying data services in a centrally managed network. To deploy data services in the centrally managed network, a topological description of the centrally managed network may be generated. The topological description may identify network entities in the centrally managed network and connections between the network entities in the centrally managed network. A data management hierarchy for the centrally managed network may be generated from the topological description of the centrally managed network. The data management hierarchy may identify one or more of the network entities at which data services may be deployed in the centrally managed network. Data services and data rules may be deployed to the identified one or more network entities based on the data management hierarchy, and data may be processed in the centrally managed network through the deployed data services.

Example Embodiments

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by a data processing apparatus, cause the apparatus to perform the actions. One general aspect includes a method for distributing data services in a network based on a topology of the network so as to provide for scalable network management in networks having large numbers of connected endpoint devices. The deployment of various data services across the network entities in the network may be performed based on a digital twin of a network topology that identifies network entities in the network at which various data services, such as message brokers, data aggregators, data normalizers, and the like may be deployed to leverage computing resources available at each network entity and data generated by endpoints attached to each network entity. The central network entity and other network entities in the network may process data through the deployed and configured data services. Other embodiments of this aspect include corresponding computer systems, apparatus, and computer programs recorded on one or more computer storage devices, each configured to perform the actions of the methods.

Generally, by configuring a network to distribute data processing services across a plurality of network entities in the network, processing overhead for ingesting and analyzing data within a network may be distributed across different network entities rather than being performed by a single network entity (e.g., the central network entity). The central network entity may periodically or aperiodically obtain information from the network entities in the network and use the obtained information to manage the network and manage performance of the network. The data obtained by the central network entity may be pre-processed (e.g., aggregated, normalized, deduplicated, etc.) by other network entities in the network to reduce processing overhead at the central network entity and leverage processing capabilities of the network entities in the network. Further, data storage may be distributed across the network entities, allowing raw data to be stored temporarily or permanently across different network entities in the network.

As described above, software defined networks generally include a central network entity that manages other network entities in the network. In managing network entities in the network, large amounts of data may be generated and used in real-time to identify issues within the network (e.g., degraded performance, dropped connections, malicious activity, etc.) and perform intent-based actions within the network (e.g., allowing or disallowing the establishment of connections with or between given endpoints, constraining threats within the network, etc.). Because software defined networks include a variety of network entities organized in a topological hierarchy, information about the position of each network entity in the hierarchy, along with information about the processing capabilities of each network entity and other operational attributes, may be used to identify locations at which various services may be deployed in the software defined network. Network entities may serve as repositories for time-series data, data aggregators for aggregating and analyzing data from a plurality of network entities, data normalizers for organizing data across the network, and the like, such that the execution of various data analytics operations may be performed using computing resources throughout the network rather than computing resources of a single entity within the network (e.g., a central network entity, such as a centralized network manager).

FIG. 1 illustrates an example network 100, according to one embodiment. As illustrated, network 100 includes a central network entity 110 and a plurality of network entities 120$_1$-120$_8$. In some examples, network entities 120$_1$-120$_8$ may include a variety of network infrastructure components, such as switches, routers, access points, and the like that allow other devices, such as a variety of endpoint devices, to connect to network 100 through one or more network entities 120 in the network 100.

As illustrated, central network entity 110 includes a central analytics engine 112. Central analytics engine 112 generally discovers a topology of the network 100 and uses the discovered topology of the network 100 to deploy various data services to network entities 110 in the network to distribute data processing operations used in analyzing data generated within network 100 to manage network 100. To discover the topology of the network 100, central analytics engine 112 traverses the network to identify each network entity 120 and endpoint device that is a member of network 100. For example, in the network illustrated in FIG. 1, central network entity 110 can identify that network entities 120$_1$ and 120$_2$ are connected to central network entity 110. Central network entity 110 can subsequently examine network entities 120$_1$ and 120$_2$ to identify the network entities and endpoints connected to network entities 120$_1$ and 120$_2$, respectively. In network 100, central network entity 110 may thus determine that network entities 120$_3$ and 120$_4$ are connected to network entity 120$_1$ and that network entities 120$_5$ and 120$_6$ are connected to network entity 120$_2$. Central analytics engine 112 may continue to examine each discovered network entity for other network entities in the network 100 until central network entity 110 has discovered each network entity 120 in network 100 (e.g., as illustrated in FIG. 1, until network entities 120$_7$ and 120$_8$ are discovered).

Using the discovered topology of the network 100, central analytics engine 112 examines network elements, connected endpoints, and expected data flow from the endpoints to generate a distributed data management hierarchy for network 100. The distributed data management hierarchy generally represents relationships between different network entities and the hardware and software capabilities of each network entity 120 in network 100. The distributed data management hierarchy may be used to identify the network entities 120 in network 100 at which various data services are deployed, as discussed in further detail below.

In generating the distributed data management hierarchy, central analytics engine 112 identifies various attributes of the network 100, including the location of data sources (e.g., network elements generating data that is typically provided to a network data platform), natural data aggregation points in the network, network entities engaged in likely east-west data flows (i.e., communications within virtual networks spanning multiple network entities), and computing resources available at each network entity 120. The identification of data aggregation points may identify network entities within a network may be network entities at which data message brokering services may be deployed. Information about computing resources available at each network entity may be used to identify the capability of each network entity to host various services, such as message brokering services, time-series databases, perform data normalization, analysis, learning, or processing tasks, and the like.

For example, smaller switches with limited storage capabilities may not be able to host a time-series database, but may be suitable for hosting a data message broker service. In another example, information about resource utilization at each network entity 120 may also be used to generate the data management hierarchy. Network entities 120 deployed in scenarios where its resources are solicited on a consistent basis may be assumed to have a relatively consistent amount of available resources. Thus, services having an expected resource utilization within the amount of available resources at a network entity 120 having a consistent amount of available resources may be deployed to that network entity. If, however, a network entity 120 has a highly variable resource utilization, central analytics engine 112 may not be able to assume that the network entity 120 has available resources in excess of those available during peak utilization at any given time. Thus, central analytics engine 112 can use the peak utilization of a network entity to determine which services can be deployed to the network entity 120.

In some embodiments, to determine the capabilities of each network entity 120 within network 100, the central analytics engine 112 can perform a simulation to identify where endpoint devices are located and how those endpoint devices are connected to network 100. The simulation may further include simulating data messages in a control plane of the network 100 to identify the messages that the central network entity 110 is sending to manage the network 100. These messages need not be actual network traffic that would be generated by endpoint devices in the network 100, but instead may be data messages that describe the structure of the network 100 and actions performed to manage network 100. By monitoring the simulated data messages in the control plane of the network 100, central analytics engine may determine relationships between different components in network 100 and where in network 100 to label data generated within network 100.

In some embodiments, the distributed data management hierarchy may define a flexible hierarchical structure in which each node, corresponding to a network entity, may have a possible data allocation along a range of possible values. Generally, the distributed data management hierarchy may identify higher-performance network entities 120 as entities that can perform more computationally expensive tasks, such as complex data normalization and data labeling. In contrast, lower-performance network entities 120 (e.g., network entities having limited computing resources or having limited spare computing resources available for use) may be identified within the distributed data management hierarchy as capable of performing less computationally expensive tasks, such as forwarding gathered data to a higher-performance network entity 120 configured to aggregate data from other network entities 120 for processing.

After central analytics engine 112 generates the distributed data management hierarchy, central analytics engine 112 can deploy data management services as services 122 executing on one or more network entities 120 within the network 100 and orchestrate the execution of services 122 based on the distributed data management hierarchy. As discussed above, services 122 deployed on network entities 120 with limited processing capabilities or limited excess computing resources may be lightweight services that can execute on these network entities 120 without adversely affecting the performance of these network entities 120. For example, the services 122 deployed on network entities 120 with limited processing capabilities may perform data brokering (or aggregation) and messaging functions. These services 122 may aggregate data from various other network entities 120 in the network 100 and provide the data to another network entity 120 for further processing. Services 122 deployed on network entities with more extensive processing capabilities or excess computing resources may, in contrast, perform more computationally expensive or complex operations on data generated within network 100 (e.g., data normalization and deduplication, data analysis, etc.).

In one example, consider a switching stack used for massive parallel processing with n switches as network entities 120. Central analytics engine 112 may configure the n network entities 120 to act as a distributed database spread across the n network entities 120, with one network entity $120_1$ acting as a master node and the other network entities $120_2$-$120_n$ acting as slave nodes in which various data storage operations may be distributed in parallel. In this deployment, data storage services may be distributed into a switching stack in a shared nothing architecture. Queries against the distributed database may be processed through network entity $120_1$ (e.g., the network entity acting as the master node) and routed to the slave node (e.g., one of network entities $120_2$-$120_n$) at which the data is stored. In some embodiments, another network entity (switch) in the switching stack may be configured as a standby master switch which may take over from network entity $120_1$ to process queries against the distributed database when network entity $120_1$ fails or is otherwise removed from the switching stack.

After deploying data services across network entities 120 in the network 100, central analytics engine 112 can create and deploy data ingestion and normalization rules for the data services 122 deployed on network entities 120. The data ingestion and normalization rules may be deployed such that the data services 122 deployed on network entities 120 clean data generated and aggregated at network entities 120 before providing the data to central analytics engine 112 for analysis. To configure data ingestion and normalization at each network entity 120 hosting a service 122, the central network entity identifies data sources within network 100 and points at which data from these data sources can be aggregated and processed to remove redundant and/or noise data from a data set. In some embodiments, the data services 122 deployed on network entities 120 may further be configured to generate summary data reports for transmission to central analytics engine 112 for analysis while retaining the raw data from which these summary reports are generated on one or more local time-series databases. The raw data may be stored such that the raw data may be referenced on-demand by central analytics engine 112.

In some embodiments, context-aware data graphs may be created at each network entity 120 and may be shared with central analytics engine 112 for combination into a global graph. The global graph generally incorporates multiple layers, with each layer representing a type of data flow and identifying where data is aggregated and processed. In some embodiments, the aggregation of data may be distributed across various network entities 120 such that some types of data are aggregated at a first node, while other types of data are aggregated on other node so as to avoid saturating network entities with data aggregation processes that may cumulatively adversely affect the performance of those network entities.

In some embodiments, the configuration of data ingestion and normalization rules for the data services 122 deployed on network entities 120 may further include distributing various data processing and analytics operations to network entities 120 in network 100. For example, the distributed data management hierarchy may identify network entities 120 including specific hardware components (e.g., graphics processing units, tensor processing units, field programmable gate arrays (FPGAs), etc.) that may be used for various machine learning operations. If network 100 includes network entities 120 having such hardware components that can be used for executing various machine learning or deep learning operations, machine learning operations may be redirected from resources in a cloud computing environment to network entities 120 within a centrally managed network 100. These network entities 120 may be configured to perform various machine learning or deep learning operations on data generated within network 100. For example, these network entities 120 may be configured to learn, for example, differences between normal and abnormal behavior within network 100. The network entities 120 may use supervised learning techniques to learn differences between normal and abnormal behavior and can use the learned differences to identify a type of abnormal behavior, such as malicious activity or non-malicious traffic spikes, represented by data generated within network 100.

In another example, services 122 may be configured to report information derived from raw data generated within network 100. Because data operations may be distributed across network entities 120 within network 100 to reduce an amount of data processing operations executed at central network entity 110, services 122 may be configured to retain the raw data from which some other information may be calculated and provide the calculated information to central analysis engine 112 (e.g., periodically or aperiodically). Consider, for example, a voice or real-time video system (e.g., voice over Internet Protocol, or VOIP) in which jitter (e.g., variations in packet delay) is measured and monitored. Generally, calculating jitter entails comparing a Real-Time Protocol (RTP) timestamp of each packet against the timestamp of the previous packet to generate a value representing inter-packet delay between different packets. Jitter calculations may be a computationally intensive process, as state information may need to be maintained for each packet in a given flow and calculations may be performed on a packet-by-packet basis. If, for example, a given voice call uses a rate of 50 packets per second, 3000 data values may be calculated per minute. To avoid overloading a central analytics engine 112 with raw data and generating a large amount of network traffic within network 100, services 122 may be configured to monitor and analyze packet jitter locally and report data to the central analytics engine 112 regularly. The reported data may include, for example, minimum, maximum, and median values for packet jitter over a given period of time, which may reduce the amount of traffic generated for jitter analysis to three data points reported periodically.

While services 122 may be configured to report information derived from or calculated from raw data generated within network 100, the raw data underlying the reported information may be of interest in further analysis of the reported information. To facilitate analysis of the raw data and allow central analytics engine 112 to see detailed state information about any client in network 100 at any given point in time, raw data may be retained at one or more network entities 120 for some amount of time. The raw data may be accessible on-demand by central analytics engine 112 to facilitate, for example, real-time troubleshooting of issues discovered within a network 100. However, because of storage limitations of the network entities 120 within network 100 (e.g., the storage limitations of different computing appliances or containers hosting network entities 120), raw data may be transferred to a central repository or data lake to avoid data loss. Each of the network entities 120 may thus be configured to upload raw data captured at a network entity 120 to the central repository or data lake based, for example, on expected activity at each network entity and an amount of data a network entity 120 can retain without losing data. Data uploads from a network entity 120 to the central repository or data lake may be configured such that the data uploads do not conflict with peak network loads at a network entity 120. In some cases, where a network entity 120 has insufficient capacity to retain raw data until off-peak times, the network entity may be configured to upload raw data in more frequent periodic intervals. In some embodiments, uploads may be performed when a network entity 120 is less busy and deferred while the network entity is serving an endpoint device. For example, consider the VOIP application discussed above. Because a large number of packets may be received at a network entity for the VOIP call, uploading raw data about each packet may impose a bandwidth overhead that may degrade the VOIP application. To minimize an impact on applications executing within network 100, raw data for a VOIP call may be uploaded after the VOIP call completes, coinciding with reduced demand on the network entity 120 and on network 100.

Generally, network entities 120 may be configured to intelligently upload raw data based on a variety of factors. These factors may include, without limitation, whether the data has been requested by central analytics engine 112, current memory and storage utilization at a network entity 120, current processor utilization at the network entity 120, bandwidth availability within network 100, and the like.

In some embodiments, central analytics engine 112 can update the discovered topology of network 100 and the distributed data management hierarchy periodically or aperiodically to identify changes to network 100, such as the addition of new network entities 120 or removal of existing network entities 120, changes in resource availability at existing network entities 120, and the like. Based on the discovered changes, central analytics engine 112 can redistribute data services across different network entities 120 in network 100 based on an updated distributed data management hierarchy. By redistributing data services periodically or aperiodically based on an updated distributed data management hierarchy, central network entity 110 can capture data generated by newly added network entities 120 in network 100 and distribute the performance of various computationally expensive tasks to network entities 120 having sufficient available computing resources and away from network entities 120 having insufficient or intermittently sufficient computing resources.

Figure 2:
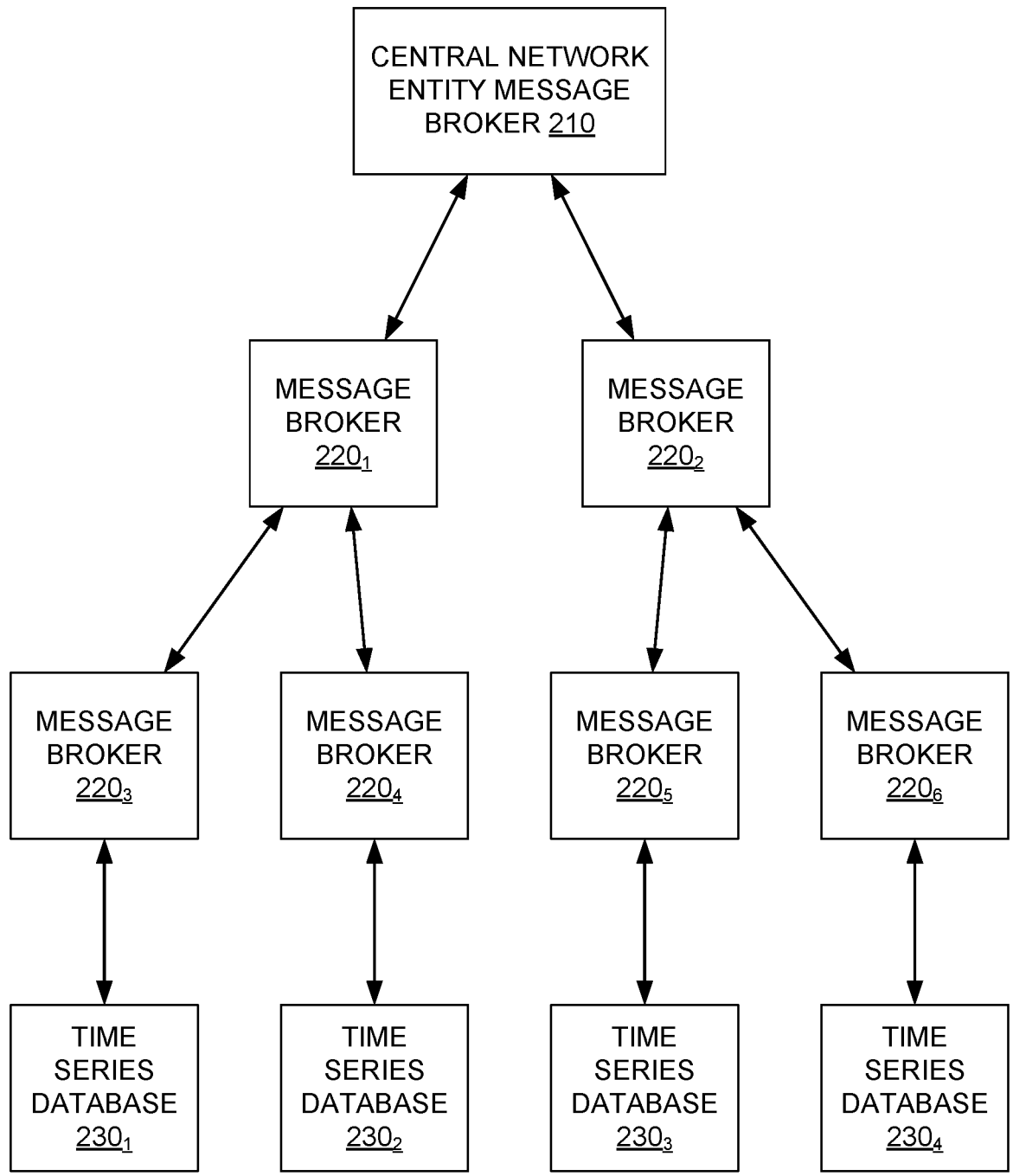
FIG. 2 illustrates a hierarchical data analytics hierarchy generated for a network and used in distributing and deploying data services to network entities in the network, according to one embodiment.

FIG. 2 illustrates an example distributed data management hierarchy 200 generated from the topology of network 100 illustrated in FIG. 1, according to one embodiment. As illustrated, distributed data management hierarchy 200 includes a central network entity message broker 210, a plurality of message brokers 220, and a plurality of time-series databases 230.

Central network entity message broker 210 generally represents the data service located at the root of the distributed data management hierarchy 200 and corresponds to data services that may be deployed on central network entity 110 to aggregate data from each of the network entities 120 in network 100. In some embodiments, central network entity message broker 210 may be further configured to periodically or aperiodically receive summarized data from one or more message brokers 220 deployed on network entities 120 within network 100 and perform various analyses of the summarized data. if central network entity message broker 210 determines that the summarized data indicates that a situation exists within network 100 warranting further investigation, central network entity message broker 210 can use a global data graph generated from local data graphs for each network entity 120 to identify the location at which information of interest in investigating the situation in the network is stored. When central network entity message broker 210 identifies the location at which information of interest is stored (e.g., the specific network entities 120 at which the information is stored), central network entity message broker 210 can query time-series databases 230 associated with the identified location to obtain raw network data for further analysis.

Each of the plurality of message brokers 220 may represent data services deployed at various network entities 120 within network 100. These message brokers 220 may expose data aggregation, normalization, and processing services configured based on computing resources available at each network entity 120 and identified locations at which data may be aggregated, as determined from a topology of network 100 generated by a central network entity 110. Generally, message brokers 220 located at some nodes may represent services that are configured to aggregate the raw data received from various other network entities and forward the gathered raw data to an upstream message broker in the distributed hierarchy for further processing. Message brokers deployed on network entities 120 having more extensive computing resources, such as more powerful processors, additional random access memory or storage space, and/or specialized hardware on which machine learning operations can be deployed and executed, may perform more complex, computationally expensive processes. For example, message brokers deployed on network entities 120 having more extensive computing resources may perform various calculations in real-time (e.g., the VOIP packet jitter calculations described above), data deduplication, and the like Time-series databases 230 generally represent data stores in which time-series information may be stored for retrieval by central analytics engine 112. As discussed, time-series databases 230 may be deployed on network entities having sufficient amounts of random access memory and storage space to store an amount of raw data and respond to requests for raw data from a central analytics engine 112 in a performant manner. In some embodiments, time-series databases 230 may further be configured to flush data stored in the time-series databases on a periodic or rolling basis. The data may be flushed from time-series databases 230 and committed to a data store at central network entity 110 so that the raw data may be made available for further investigation in the future. As discussed, time-series databases 230 may be flushed according to a schedule that accounts for peak traffic load times at a network entity 120, amounts of computing resources available at a network entity 120 at any given time, and the like. Based on these properties of each network entity 120 on which a time-series database is hosted, data from time-series database 230 may be committed to a centralized data store or data lake at times outside of peak load times and may be committed according to a schedule that minimizes the risk of losing raw data generated by any given network entity 120.

As illustrated, data management hierarchy 200 includes a first layer of message brokers (e.g., message brokers $220_1$ and $220_2$) below the central network entity message broker 210. Message brokers $220_1$ and $220_2$ may aggregate data received from message brokers 220 located in a layer of the data management hierarchy 200 below the first layer of message brokers. Thus, as illustrated in FIG. 2, message broker $220_1$ may aggregate and process data received from message brokers $220_3$ and $220_4$, while message broker $220_2$ may aggregate and process data received from message brokers $220_5$ and $220_6$.

As illustrated, each of message brokers $220_3$, $220_4$, $220_5$, and $220_6$ may be connected to a time series database 230. Time series database 230 may, as discussed, represent locations at which raw network data may be stored and made available to a central network entity message broker 210 for analysis. The data stored in each time series database 230 may include data generated by a variety of network entities 120 within network 100 and aggregated by a specific message broker 220 associated with a specific time series database. The contents of time series database 230 may be queried by central network entity message broker 210 and may be uploaded to a central data repository or data lake according to a schedule that allows each network entity 120 hosting a time series database 230 to upload raw data to the central data repository without losing data stored in a time series database 230 (e.g., due to overwriting old data records within a time series database 230).

Figure 3:
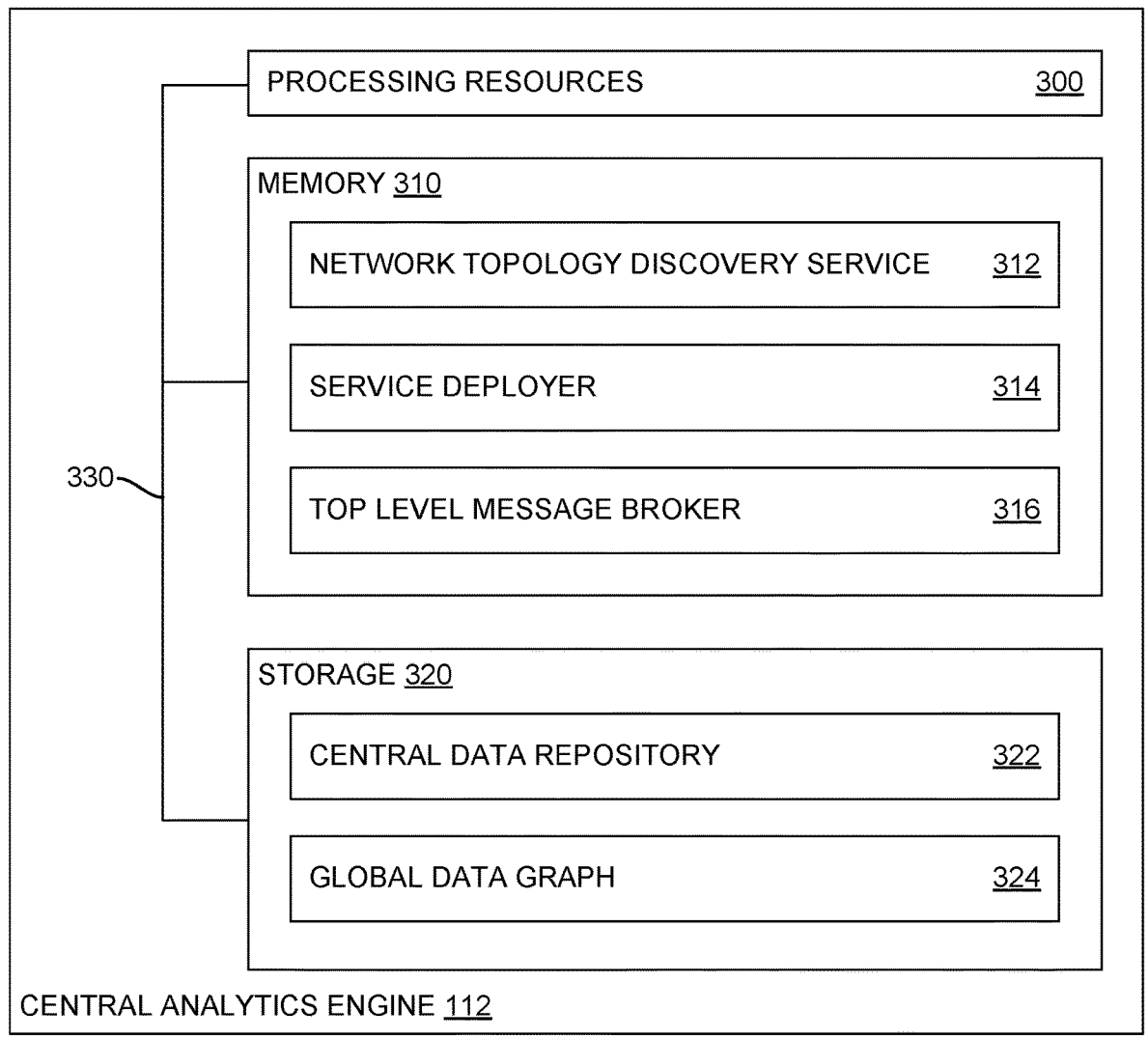
FIG. 3 illustrates an example central analytics engine of a central network entity for managing deployment of data services within a network, according to one embodiment.

FIG. 3 illustrates an example central analytics engine 112 that can discover a network topography of network 100, generate a distributed data management hierarchy from the discovered network 100, and deploy data services to network entities 120 within network 100 based on the generated distributed data management hierarchy, according to one embodiment. As illustrated, central analytics engine 112 includes processing resources 300, memory 310, and storage 320, connected via a bus 330.

Memory 310 generally includes a network topology discovery service 312, a service deployer 314, and a top level message broker 316. Network topology discovery service 312 generally is configured to discover network entities in a network 100, such as routers, switches, access points, and the like, as well as endpoint devices connected to network 100. Based on the discovered network topology, network topology discovery service 312 can generate a distributed data management hierarchy identifying data aggregation points within network 100 and available resources at each network entity 120 in the network. As discussed above, information about the available resources at a network entity 120 may be used to determine what services may be deployed to network entities 120 within network 100 such that computationally simple services are deployed to network entities 120 that have limited processing capabilities or limited excess computing resources and computationally expensive services are deployed to network entities 120 with more extensive processing capabilities or more excess computing resources. In some embodiments, the information about the available resources at network entities 120 in network 100 may further include information about the presence or absence of specialized hardware, such as graphics processing units, tensor processing units, field programmable gate arrays, and the like, at network entities 120 that may be used for highly complex operations, such as training machine learning models to identify anomalous and non-anomalous activity within network 100.

Service deployer 314 generally uses the distributed data management hierarchy to deploy and configure data services at various network entities 120 within network 100. Network entities 120 identified as data aggregation points within network 100 may be configured by service deployer 314 to host a data aggregation service and a data storage service in which raw data from one or more other network entities and/or endpoint devices is stored. Other network entities 120, such as those identified in the distributed data management hierarchy as network entities having more extensive processing capabilities or excess computing resources, may be configured by service deployer 314 to host services executing more computationally expensive tasks, such as data normalization, data deduplication, real-time data analysis, and the like. In some embodiments, service deployer 314 may further deploy data ingestion and normalization rules to the network entities 120 in the network 100 to identify the data that each network entity 120 hosting a service 122 is to report to other network entities 120 and/or central network entity 110. The data ingestion and normalization rules may further identify a schedule at which raw data may be offloaded from local time-series databases to a central data store or data lake.

In some embodiments, service deployer 314 may additionally deploy a top level message broker 316 to central analytics engine 112. Top level message broker 316 may be configured to aggregate data from a variety of services 122 deployed to network entities 120 in network 100 and analyze the aggregated data to manage network 100. When top level message broker 316 identifies anomalies in the data reported by the deployed services 122, top level message broker 316 can request raw data from the appropriate services 122 to analyze in further detail.

Storage 320 generally includes a central data repository 322 and a global data graph 324. Central data repository 322 generally provides a persistent data store in which raw data reported by the network entities 120 may be stored for future analysis. Central data repository 322 may be periodically updated with newly captured raw data according to an upload schedule determined for each network entity 120 based on an expected resource utilization for data upload operations, an amount of data each network entity 120 can store, peak resource utilization times at each network entity 120, and the like. Global data graph 324 generally represents an amalgamation of data graphs generated for each of the network entities 120 identifying data flows and locations at which raw data for any given network operation may be stored. When top level message broker 316 receives summary data from the network entities 120 and identifies an anomaly in the network (e.g., anomalous traffic, degraded performance, etc.), top level message broker 316 can use the global data graph to identify the location at which raw data associated with the received summary data is located and query for the raw data from the identified location.

Figure 4:
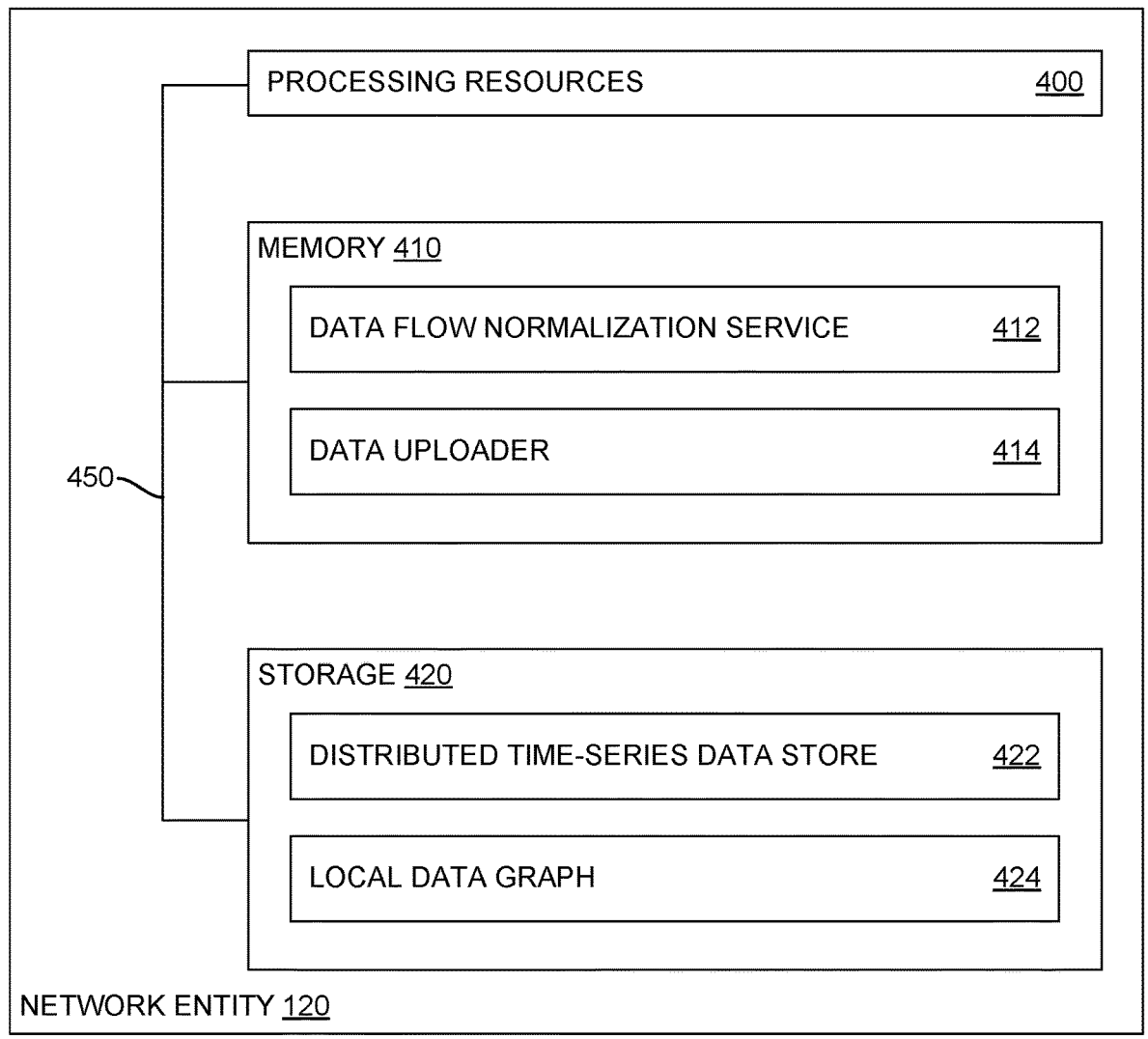
FIG. 4 illustrates an example network entity having one or more data services deployed thereon by the central network entity, according to one embodiment

FIG. 4 illustrates an example network entity 120 on which data services may be deployed in a distributed data management hierarchy, according to one embodiment. As illustrated, network entity 120 includes processing resources 400, memory 410, and storage 420, connected via a bus 430.

Memory 410 generally includes a data flow normalization service 412 and a data uploader 414. Data flow normalization service 412 generally represents a service and data processing rules deployed to network entity 120 for processing data generated within network 100 and providing information to a central network entity 110 for further analysis. The operations performed by any given data flow normalization service 412 may differ based on the available computing resources at a network entity. As discussed, a data flow normalization service 412 deployed on network entities 120 with more extensive computing resources may perform more computationally expensive operations, such as real-time data processing, deduplication, and other operations for reducing noise in the data gathered within network 100. Meanwhile, a data flow normalization service 412 deployed on network entities 120 with less extensive computing resources may perform less computationally expensive operations, such as aggregating data from a plurality of network entities 120 into a single data set which can be provided to other network entities 120 for analysis.

Data uploader 414 generally uploads captured raw data from distributed time-series data store 422 according to a schedule determined based on resource available at network entity 120. Generally, data uploader 414 may upload captured raw data to a central data store or data lake in a manner that allows for network entity 120 to continually record data about network 100 while avoiding performance degradation at the network entity 120. For example, data uploader 414 may be configured to upload data during off-peak times during which the network entity 120 is serving relatively few devices. In another example, when network entity 120 may not have sufficient storage capacity to store raw data until off-peak times, data uploader 414 may be configured to upload data using shorter periods, after specified activity has terminated, or the like.

Storage 420 generally includes a distributed time-series data store 422 and a local data graph 424. Distributed time-series data store 422 generally represents a data repository, such as a database, a log file, a flat file store, or other area in which data may be stored, in which information about operations performed within network 100 is temporarily stored until such data is uploaded to a central data repository or data lake by data uploader 414. Distributed time-series data store 422 may be accessible to a central network entity 110 and may provide requested data to central network entity 110 on request.

Local data graph 424 generally represents a data structure identifying the data aggregated at a network entity 120, the locations at which such data may be stored, and the originating network entities for such data. When a network entity 120 is configured to execute a service 412 as part of a distributed data management hierarchy, local data graph 424 may be generated to identify, to a central network entity 120, the data aggregated at or processed by the network entity 120. The local data graph 424 may be provided to the central network entity 110 for amalgamation with other local data graphs such that the amalgamation of data graphs provides a full identification of the data captured and aggregated in network 100, the locations at which the data is captured and aggregated, and the like.

Figure 5:
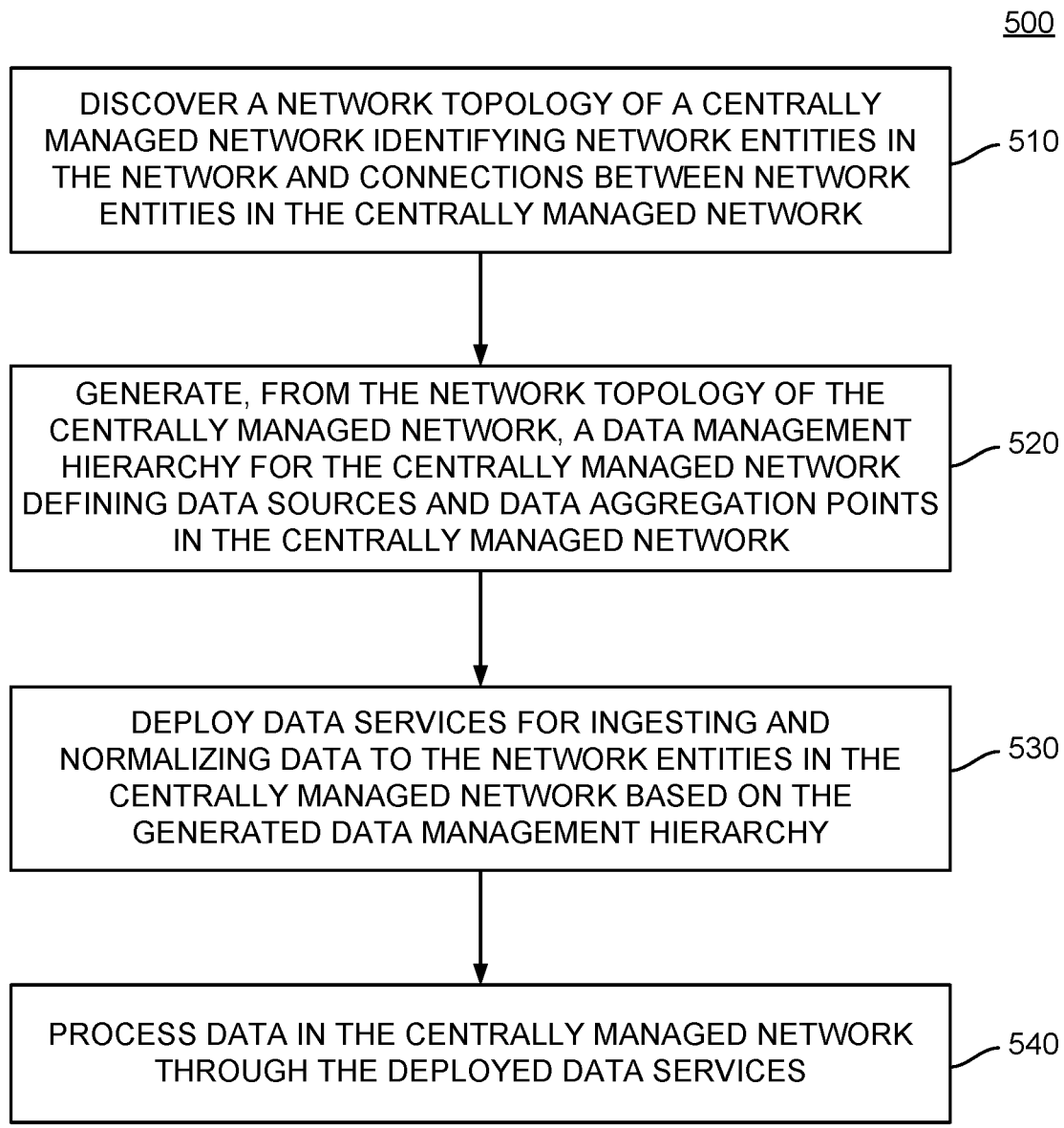
FIG. 5 is a flow chart outlining general operations for discovering a network topology and distributing data services within a network based on the discovered network topology, according to embodiments described herein.

FIG. 5 illustrates example operations that may be performed by a central network entity (e.g., central network entity 110 illustrated in FIG. 1) to deploy scalable, hierarchical, data automation services in a network, according to an embodiment. As illustrated, operations 500 may enter at block 510, where the central network entity discovers a network topology of a centrally managed network. The network topology generally identifies network entities in the network and connections between network entities in the centrally managed network.

At block 520, the central network entity generates, from the network topology of the centrally managed network, a data management hierarchy for the centrally managed network. The data management hierarchy generally defines data sources and data aggregation points in the centrally managed network. Data sources may be defined as network entities 120 that may generate and potentially store information about operations within the network 100. Data aggregation points may represent locations within network 100 in which data from multiple data sources may be combined and, in some cases, analyzed, with the resulting analysis being provided to a central network entity for further analysis. In some embodiments, the data management hierarchy may be generated based on computing resources available at each network entity 120 in network 100. For example, based on an identification of a network entity as a network entity having limited computing resources or limited available computing resources, the data management hierarchy may identify the network entity as a location at which data may be aggregated and handed off to other network entities for analysis. Similarly, based on an identification of a network entity as a network entity having more extensive computing resources, the data management hierarchy may identify the network entity as a location at which more computationally expensive data processing operations may be performed.

At block 530, the central network entity deploys data services for ingesting and normalizing data to the network entities in the centrally managed network based on the generated data management hierarchy. In some embodiments, deploying data services to the network entities may include configuring various data ingestion and processing rules for each network entity on which services are deployed. These data ingestion and processing rules may indicate, for example, what data is to be logged or retained for further analysis, how data is to be deduplicated (e.g., what duplicate data may be retained and what duplicate data may be discarded), the types of data to be reported to the central network entity by a service deployed on a network entity 120, and the like.

At block 540, the central network entity processes data in the centrally managed network through the deployed data services. In some embodiments, the central network entity may act as a top-level data broker in which data from a variety of network entities is aggregated and analyzed. Based on the analysis, the central network entity can identify potential issues within network 100 and request further information from one or more network entities to analyze these potential issues, identify the state of the network at the time an issue arises, and take action to rectify any issues in the network identified from the data stored within the network.

Figure 6:
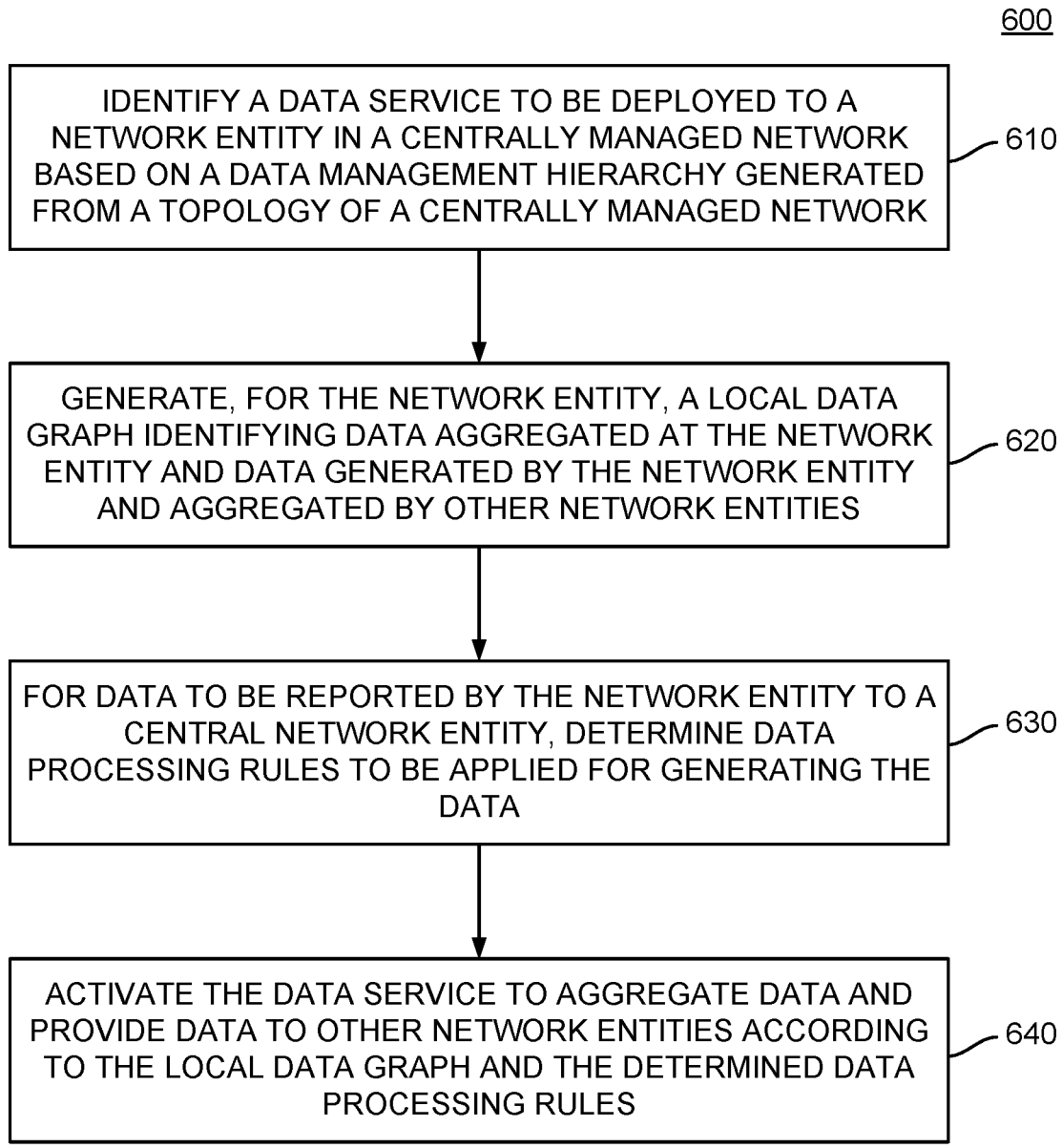
FIG. 6 is a flow chart outlining general operations for configuring distributed data services at network entities within a network, according to embodiments described herein.

FIG. 6 illustrates example operations that may be performed by a central network entity to configure services deployed to network entities in deploying scalable, hierarchical, data automation services in a network, according to an embodiment. As illustrated, operations 600 may enter at block 610, where the central network entity identifies a data service to be deployed to a network entity in a centrally managed network. The data service to be deployed may be identified based on a data management hierarchy generated from a topology of a centrally managed network. For example, as discussed above, the data services deployed to a given network entity may be identified based on information in a data management hierarchy identifying the network entity as a location at which data from one or more other network entities may be aggregated and/or processed.

At block 620, the central network entity generates, for the network entity, a local data graph. The local data graph may identify data aggregated at the network entity and data generated by the network entity for aggregation by other network entities. In some embodiments, the local data graph may identify the sources of data aggregated at the network entity and locations at which the data may be stored for future analysis.

At block 630, for data to be reported by the network entity to the central network entity, the central network entity determines data processing rules to be applied at the network entity for generating the data to be reported. The rules may identify, for example, the types of data to be calculated and reported by a network entity, a periodicity at which the generated data is to be reported, and the like. In some embodiments, the rules may further identify, for example, data uploading and retention policies for the raw data used by the network entity to generate the data reported by the central network entity and other rules that may be appropriate.

At block 640, the central network entity activates the data service. In activating the data service, the central network entity may active data aggregation and generation services and the provision of data to other network entities according to the local data graph and the determined data processing rules.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As described above, including in relation to FIGS. 3 and 4, various computing components may be included to perform the methods described herein. For example, buses 350 and 450 represent one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, central network entity 110 and network entities 120 typically include a variety of computer system readable media. Such media may be any available media that is accessible by central network entity 110 and/or network entities 120, and it includes both volatile and non-volatile media, removable and non-removable media.

Memory 310 illustrated in FIG. 3 and memory 410 illustrated in FIG. 4 can include computer system readable media in the form of volatile memory, such as random access memory (RAM) and/or cache memory. Central network entity 110 and network entities 120 may further include other removable/non-removable, volatile/non-volatile computer system storage media. In some examples, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 or bus 450 by one or more data media interfaces.

As depicted and described above, memory 310 illustrated in FIG. 3 and memory 410 illustrated in FIG. 4 may include at least one program product having a set (e.g., at least one) of program modules that are configured to carry out the functions of embodiments of the invention. The central network entity 110 and network entities 120 may further include other removable/non-removable volatile/non-volatile computer system storage media. In some examples, a storage system may be included as part of memory 310 and memory 410 and may typically provide a non-volatile memory for the networked computing devices, and may include one or more different storage elements such as Flash memory, a hard disk drive, a solid state drive, an optical storage device, and/or a magnetic storage device.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for deploying data services in a centrally managed network, comprising:
    generating a topological description of the centrally managed network, the topological description identifying network entities in the centrally managed network and connections between the network entities in the centrally managed network;
    generating, from the topological description of the centrally managed network, a data management hierarchy for the centrally managed network, wherein the data management hierarchy identifies a first one or more of the network entities at which data services may be deployed in the centrally managed network;
    deploying data services and data rules to the first one or more network entities based on the data management hierarchy, comprising:
        generating, for each of the first one or more network entities, a local data graph describing data aggregated at each of the first one or more network entities and data generated by each of the first one or more network entities for consumption by other network entities in the centrally managed network; and processing data in the centrally managed network through the deployed data services.

2. The method of claim 1, wherein the data management hierarchy comprises a hierarchy identifying computing resources available at each network entity of the first one or more network entities, wherein a first network entity, of the first one or more network entities, comprises fewer computing resources compared with a second network entity, of the first one or more network entities, wherein a first one or more services are computationally less expensive compared with a second one or more services, and wherein deploying data services to the first one or more network entities comprises deploying the first one or more services to the first network entity based on the first one or more services being computationally less expensive and deploying the second one or more services to the second network entity.

3. The method of claim 1, wherein the data management hierarchy identifies network entities at which data services may be deployed in the centrally managed network based on processing load patterns at the first one or more network entities.

4. The method of claim 1, wherein at least one of the deployed data services comprises a data normalization service configured to aggregate data from a plurality of the network entities in the centrally managed network and remove duplicate data from the aggregated data.

5. The method of claim 1, wherein at least one of the deployed data services comprises a data analysis service executing on a first network entity of the first one or more network entities, the data analysis service being configured to generate summary data from an aggregated data set and provide the generated summary data to a central network entity, and wherein the aggregated data set is stored in a time-series database located at the first network entity or the central network entity.

6. The method of claim 1, further comprising:
monitoring the network entities in the centrally managed network for changes in resource availability; and
redistributing data services across the network entities in the centrally managed network based on the monitored changes in resource availability.

7. The method of claim 1, further comprising:
generating a global data graph based on an aggregation of the local data graphs generated for each of the first one or more network entities.

8. The method of claim 7, wherein processing data in the centrally managed network comprises:
identifying, based on data reported to a central network entity, one or more data sets to retrieve from time-series databases deployed at a second one or more of the network entities in the centrally managed network; and
retrieving the one or more data sets based on an identification in the global data graph of the second one or more of the network entities at which the one or more data sets are stored.

9. The method of claim 1, wherein the data rules comprise rules identifying a schedule at which raw data is to be uploaded from a plurality of the network entities on which time-series database services are deployed, the schedule being based on at least one of peak resource utilization at the plurality of the network entities and an amount of data that can be stored at each of the plurality of the network entities.

10. The method of claim 1, wherein:
the centrally managed network comprises a set of switches in a distributed network switch stack;
one switch in the set of switches is designated as a master switch; and
deploying data services and data rules to the first one or more network entities comprises distributing a database service across switches in the set of switches other than the designated master switch.

11. A system, comprising:
a processor; and
a memory having instructions stored thereon which, when executed on the processor, performs an operation for deploying data services in a centrally managed network, the operation comprising:
generating a topological description of the centrally managed network, the topological description identifying network entities in the centrally managed network and connections between the network entities in the centrally managed network;
generating, from the topological description of the centrally managed network, a data management hierarchy for the centrally managed network, wherein the data management hierarchy identifies a first one or more of the network entities at which data services may be deployed in the centrally managed network;
deploying data services and data rules to the first one or more network entities based on the data management hierarchy,
wherein the data rules comprise rules identifying a schedule at which raw data is to be uploaded from a second plurality of the network entities on which database services are deployed, the schedule being based on at least one of: (i) peak resource utilization at the second plurality of the network entities or (ii) an amount of data that can be stored at each of the second plurality of the network entities, and wherein the database services comprise time-series database services; and
processing data in the centrally managed network through the deployed data services.

12. The system of claim 11, wherein the data management hierarchy comprises a hierarchy identifying computing resources available at each network entity of the first one or more network entities, wherein a first network entity, of the first one or more network entities, comprises fewer computing resources compared with a second network entity, of the first one or more network entities, wherein a first one or more services are computationally less expensive compared with a second one or more services, and wherein deploying data services to the first one or more network entities comprises deploying the first one or more services to the first network entity based on the first one or more services being computationally less expensive and deploying the second one or more services to the second network entity.

13. The system of claim 11, wherein the data management hierarchy identifies network entities at which data services may be deployed in the centrally managed network based on processing load patterns at the first one or more network entities.

14. The system of claim 11, wherein the operation further comprises:
monitoring the network entities in the centrally managed network for changes in resource availability; and
redistributing data services across the network entities in the centrally managed network based on the monitored changes in resource availability.

15. The system of claim 11, wherein deploying the data services and data rules to the identified network entities comprises generating, for each of the first one or more network entities, a local data graph describing data aggregated at each of the first one or more network entities and data generated by each of the first one or more network entities for consumption by other network entities in the centrally managed network.

16. The system of claim 15, wherein the operation further comprises:
   generating a global data graph based on an aggregation of the local data graphs generated for each of the first one or more network entities.

17. The system of claim 16, wherein processing data in the centrally managed network comprises:
   identifying, based on data reported to a central network entity, one or more data sets to retrieve from time-series databases deployed at a second one or more of the network entities in the centrally managed network; and
   retrieving the one or more data sets based on an identification in the global data graph of the second one or more of the network entities at which the one or more data sets are stored.

18. A non-transitory computer-readable medium having instructions stored thereon which, when executed by a processor, performs an operation for deploying data services in a centrally managed network, the operation comprising:
   generating a topological description of the centrally managed network, the topological description identifying network entities in the centrally managed network and connections between the network entities in the centrally managed network;
   generating, from the topological description of the centrally managed network, a data management hierarchy for the centrally managed network, wherein the data management hierarchy identifies a first one or more of the network entities at which data services may be deployed in the centrally managed network;
   deploying data services and data rules to the first one or more network entities based on the data management hierarchy, comprising:
      generating, for each of the first one or more network entities, a local data graph describing data aggregated at each of the first one or more network entities and data generated by each of the first one or more network entities for consumption by other network entities in the centrally managed network; and
   processing data in the centrally managed network through the deployed data services.

\* \* \* \* \*